US012731582B2

(12) United States Patent
Brachman et al.

(10) Patent No.: US 12,731,582 B2
(45) Date of Patent: Sep. 8, 2026

(54) NATURAL LANGUAGE PROCESSING MODEL FOR TASK-BASED SYSTEM

(71) Applicant: International Business Machines Corporation, Armonk, NY (US)

(72) Inventors: Michelle Brachman, Quincy, MA (US); James Johnson, Somerville, MA (US); Qian Pan, Canton, MA (US); Casey Dugan, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 18/112,858

(22) Filed: Feb. 22, 2023

(65) Prior Publication Data

US 2024/0282299 A1 Aug. 22, 2024

(51) Int. Cl.
*G10L 15/22* (2006.01)
*G10L 15/07* (2013.01)

(52) U.S. Cl.
CPC .............. *G10L 15/22* (2013.01); *G10L 15/07* (2013.01); *G10L 2015/223* (2013.01)

(58) Field of Classification Search
CPC .... G10L 15/22; G10L 15/07; G10L 2015/223
See application file for complete search history.

(56) References Cited

U.S. PATENT DOCUMENTS 11,200,074 B2 12/2021 Bat Ulzii et al.
11,532,301 B1 * 12/2022 Hajebi .................... G06F 40/35
2019/0385471 A1 12/2019 Harris et al.
2020/0118544 A1 * 4/2020 Lee ........................ G10L 15/063
2022/0068153 A1 3/2022 Harlow et al.
2022/0366901 A1 * 11/2022 Rathaur ................ G06F 16/245

FOREIGN PATENT DOCUMENTS

AU 2011255614 A1 * 11/2012 ....... G06F 16/24578
AU 2014233517 A1 * 9/2015 ............. G10L 15/22
AU 2015210460 A1 * 9/2015 ........... G10L 15/183
CN 102982023 A 3/2013
EP 4312147 A2 * 1/2024 ........... G10L 15/197
KR 10-2011-0021019 A 3/2011

(Continued)

OTHER PUBLICATIONS

R. Blanco, et al., "Entity Recommendations in Web Search", In International semantic Web conference (pp. 33-48). Springer, Berlin, Heidelberg, Oct. 2013, 16 pages.

(Continued)

*Primary Examiner* — Mohammad K Islam
(74) *Attorney, Agent, or Firm* — Harrity & Harrity, LLP

(57) ABSTRACT

A present invention embodiment analyzes user input via natural language processing. A natural language utterance from a user is analyzed to determine one or more computing tasks. the natural language utterance is analyzed using a knowledge base to identify one or more modifications to the natural language utterance that are based on previous user modifications to a previous user utterance. An indication that the user accepted at least one modification of the one or more modifications is received, wherein the at least one modification modifies the one or more computing tasks. The modified one or more computing tasks are executed.

20 Claims, 9 Drawing Sheets

(56) References Cited

FOREIGN PATENT DOCUMENTS

| | | | | |
|---|---|---|---|---|
| WO | WO-2017160341 A1 * | 9/2017 | ............. | G10L 15/22 |
| WO | WO-2023017320 A1 * | 2/2023 | ............. | G10L 15/22 |

OTHER PUBLICATIONS

U. Ehsan, et al., "Expanding Explainability: Towards Social Transparency in AI systems", CHI '21, May 8-13, 2021, Yokohama, Japan, 19 pages.

L. Quijano-Sanchez, et al., "Social Factors in Group Recommender Systems", ACM Trans. Intell. Syst. Technol. 4, 1, Article 8 (Jan. 2013), 30 pages.

H. B. Kang, et al., "From Who You Know to What You Read: Augmenting Scientific Recommendations with Implicit Social Networks", In CHI Conference on Human Factors in Computing Systems (CHI '22), Apr. 29-May 5, 2022, New Orleans, LA, USA. ACM, New York, NY, USA, 23 pages.

IBM, "IBM App Connect", available online at <https://web.archive.org/web/20230114023631/https://www.ibm.com/products/app-connect>, Jan. 14, 2023, 09 pages.

* cited by examiner

| CREATED | MAIL | MESSAGE |
| --- | --- | --- |
| INCIDENT IS CREATED<br>IS CREATED ON<br>CREATED IN CLOUD SERVICES | A MAIL MESSAGE<br>CREATED A MAIL<br>MAIL MESSAGE IN | A MAIL MESSAGE<br>MAIL MESSAGE IN<br>MESSAGE IN EMAIL CLIENT |

NATURAL LANGUAGE PROCESSING MODEL FOR TASK-BASED SYSTEM

BACKGROUND

1. Technical Field

Present invention embodiments relate to natural language processing, and more specifically, to executing computing tasks using a natural language processing model.

2. Discussion of the Related Art

Natural language processing (NLP) is a subfield of artificial intelligence and computational linguistics that relates to interactions between computers and humans using natural language. NLP models can analyze and process human language, including speech and text, to gain meaning and insights from the data. Task-based NLP models, such as digital assistants, can perform tasks based on natural language input using a combination of NLP and machine learning techniques. These tasks can include, for example, setting a reminder or alarm, providing information, making an online purchase, sending a message, and the like. Typically, an NLP model is designed so that users may interact with the model in a conversational and natural way, without having to learn specific commands or syntax. However, NLP models may often perform incorrect tasks that go against a user's intent.

SUMMARY

According to one embodiment of the present invention, a system is provided for analyzing user input via natural language processing. A natural language utterance from a user is analyzed to determine one or more computing tasks. the natural language utterance is analyzed using a knowledge base to identify one or more modifications to the natural language utterance that are based on previous user modifications to a previous user utterance. An indication that the user accepted at least one modification of the one or more modifications is received, wherein the at least one modification modifies the one or more computing tasks. The modified one or more computing tasks are executed. Embodiments of the present invention further include a method and computer program product for analyzing user input via natural language processing in substantially the same manner described above.

BRIEF DESCRIPTION OF THE DRAWINGS

Generally, like reference numerals in the various figures are utilized to designate like components.

DETAILED DESCRIPTION

Figure 1:
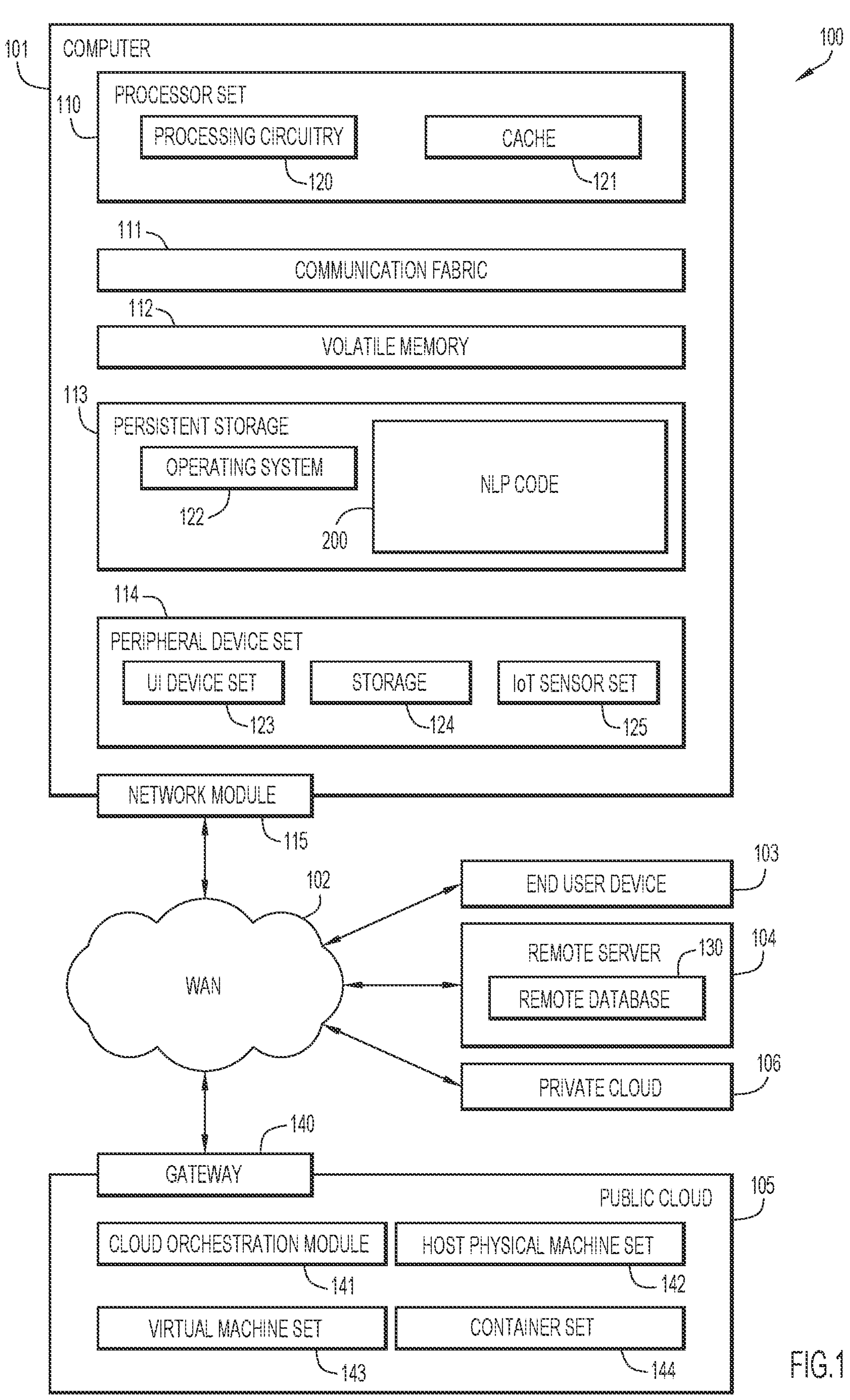
FIG. 1 is a diagrammatic illustration of an example computing environment according to an embodiment of the present invention.

A present invention embodiment relates to natural language processing (NLP), and more specifically, to executing computing tasks using an NLP model. When a user provides natural language input to an NLP model, the model parses the input in order to determine which task or tasks the user desires to execute. The type of task that is performed can depend on the particular NLP model, which may perform natural language-to-code generation, natural-language-to-query execution, digital assistant task, data analytics, and the like. These systems typically have constrained sets of tasks that a user can request, but may enable a user to input any natural language sentence. Thus, the user may not know which types of natural language inputs can actually be executed, and the user may not know which tasks the system is capable of performing.

Thus, present invention embodiments utilize the collective intelligence of other users who have modified their commands, successfully or unsuccessfully, in order to help newer users to understand the types of natural language inputs that should be provided to achieve desired goals. Using NLP techniques in combination with a knowledge base of previous user interactions, users can be prompted to modify their natural language inputs in order to cause the system to execute the particular tasks that the user most likely intends for the system to execute.

Accordingly, present invention embodiments improve the field of natural language processing by enabling users to more quickly execute desired tasks, thereby reducing the amount of computational resources would otherwise be unnecessarily consumed executing undesired tasks. Additionally, as users interact with present invention embodiments over time, the knowledge base (which is shared among a set of users and therefore includes many records of various users' interactions) is continuously expanded, thereby providing an NLP model that is self-improving over time. Present invention embodiments provide the practical application of improving user interactions with NLP models by presenting to users how their input is interpreted and enabling users the learn how to more effectively interact with NLP models, thus improving user experience.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, computing environment 100 contains an example of an environment for the execution of at least some of the computer code involved in performing the inventive methods, such as NLP code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located “off chip.” In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as “the inventive methods”). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
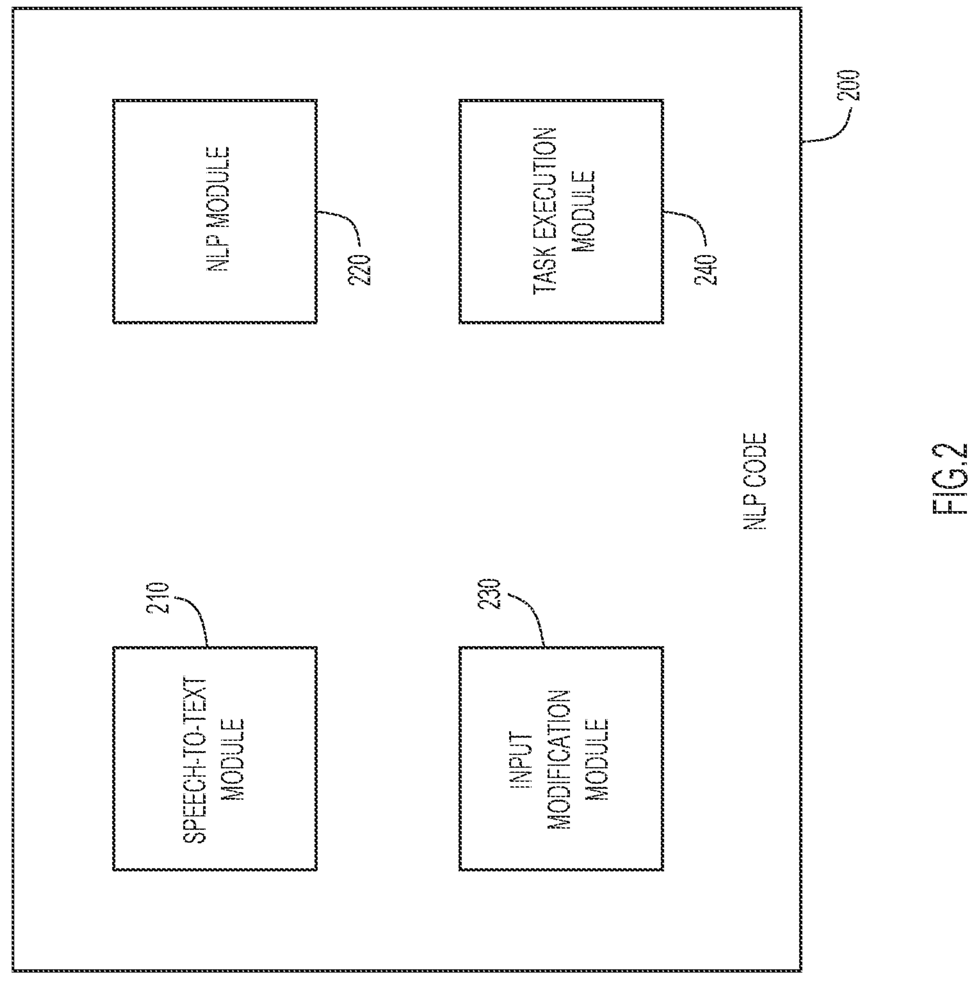
FIG. 2 is a block diagram of NLP code according to an embodiment of the present invention.

A block diagram of NLP code 200 according to an embodiment of the present invention is illustrated in FIG. 2. Specifically, NLP code 200 includes a speech-to-text module 210, an NLP module 220, an input modification module 230, and a task execution module 240.

Speech-to-text module 210 may process natural language words or phrases (i.e., utterances) of a user by converting the utterances into text that is suitable for further processing in accordance with present invention embodiments. Speech-to-text module 210 may employ any speech-to-text model, which can include a trained machine learning model or other algorithmic approaches. Speech-to-text module 210 may perform speech-to-text conversion in one or more stages, such as speech signal processing, feature extraction, acoustic modeling, and/or language modeling. Initially, the raw speech signal of a user may be captured by a microphone and pre-processed to remove any noise and/or to normalize the signal. Then, the processed signal is transformed into a set of meaningful features, such as mel-frequency cepstral coefficients (MFCCs), that represent the speech signal. The extracted features can be used as input to an acoustic model, which maps the features to a sequence of phonemes, the smallest unit of sound in a word. The phonemes may be passed to a language model, which determines the probabilities of different word sequences based on the language being used. Thus, a text transcript of spoken language can be generated. In some embodiments, filler words or other undesired data (e.g., coughing or sneezing) may be detected and omitted from processing.

NLP module 220 may process text that is output by speech-to-text module 210 in order to determine a semantic meaning of the text and to identify one or more computing tasks that the user may desire to be executed. NLP module 220 may use one or more NLP techniques, or combinations thereof, such as lexical analysis, part-of-speech tagging, and/or dependency parsing, to identify the meaning of the input. NLP module 220 may utilize one or more machine learning algorithms, such as decision trees, support vector machines, and/or neural networks (e.g., recurrent neural networks, convolutional neural networks, etc.) to determine the intended task and the associated parameters. NLP module 220 may employ a machine learning model that is trained to map text to computing tasks. In particular, NLP module 220 may be trained using a training set of examples of text and corresponding commands. For example, the training data may include various examples of commands such as "execute," "run," "start," "send," "create," "delete," "edit," "open," "terminate," and then the name of a particular computer program or specific task. The training data may also include parameters for tasks so that NLP module 220 can perform specific actions that include those parameters. For example, a user may utter "open a terminal session and execute sudo apt-get install browser" so that NLP can identify that a terminal should be opened and the parameter "sudo apt-get install browser" should be provided as input to the terminal and executed.

In some embodiments, NLP module 220 may be trained using examples of sequences of two or more tasks so that NLP module 220 can identify multiple tasks in a user's utterances. The sequence of tasks may be executed independently of each other, or may depend on each other, and may indicate a particular order in which the tasks should be executed. Independent tasks may include tasks that do not affect each other. For example, "open a word processor and open a web browser" may be performed independently of each other, and the order in which each task is executed may not be important. Dependent tasks, however, may require a certain sequence, as one task may use another task's output as its own input. For example, "download the displayed image and open it in a graphics editor" requires that the actions be performed in a certain sequence, as the image must be obtained before the image is opened in the graphics editor.

Input modification module 230 may analyze the tasks that are identified by NLP module 220 to determine if any modifications should be proposed to the user regarding the user's utterances that were processed by speech-to-text module 210 and NLP module 220. In particular, input modification module 230 may compare the user's utterances to a knowledge base that stores other user utterances along with how those users modified their utterances and the tasks that those users eventually accepted for execution. The knowledge base may be stored in a database or other storage medium, such as persistent storage 113, storage 124, or remote database 130, as depicted and described in further detail with reference to FIG. 1. Thus, the knowledge base may contain records of historical user interactions with a natural language processing model. Each record may be scored according to how a user accepts or declines that example. If a user modifies the user's input according to with how the previous user modified their input, then that previous user record may be scored more favorably so that it will be more likely to be recommended by input modification module 230 in the future. In some embodiments, if a user is prompted with a modification that the user declines, the score of the associated record in the knowledge base may be negatively adjusted to account for this.

Initially, input modification module 230 may search the knowledge base to identify any records whose initial historical user input is an exact match (i.e., identical) for a current user's input, and if there is an exact match, then input modification module 230 may present the proposed modification(s) of that match to the user. The modification or modifications can be identified by comparing the initial input of a record of historical user input to the final input of the same record, and identifying the differences. In the case that there are multiple records in the knowledge base that are an exact match for a user's input, the record with the highest score may be selected to be used to propose modifications to a user. In some embodiments, if there is no exact match in the knowledge base, a closest match may be found using conventional or other techniques to identify similar text samples. For example, a vector space model may be employed and a cosine similarity metric may be utilized to identify similar text samples, a nearest-neighbor mapping technique, and the like. A set of closest matches may be identified, and a particular record can be used to propose modifications based on the record's closeness to the current user input, the record's score, or both. For example, distance and score can be given different weights in order to select a particular record, as there may be a record having a slightly-less semantically-similar user input, but may be scored much more highly than other similar records.

Input modification module 230 may prompt the user with modifications to the user's input using a user interface, and the user can choose to accept or deny any proposed modification. When a user finalizes the user's input for execution, input modification module 230 may provide the finalized input to NLP module 220, which identifies one or more computing tasks and provides those tasks to task execution module 240.

Task execution module 240 may perform the task or tasks that have been identified by NLP module 220. Task execution module 240 may be configured to directly perform any computing task, or task execution module 240 may send a request to another entity to cause a task to be performed. For example, task execution module 240 may cause computing tasks to be performed using an Application Programming Interface (API) that accesses an operating system or other local or remote application. The computing tasks that can be executed by task execution module 240 can include any task, such as opening a document, saving a document, closing a document, emailing a document, executing a script, enabling or disabling an attribute, actuating a user interface element, launching an application, terminating an application, transmitting a message, and the like. This list of examples, however, is non-exhaustive, as task execution module 240 can be configured to perform any task, or cause any task to be performed.

Figure 3:
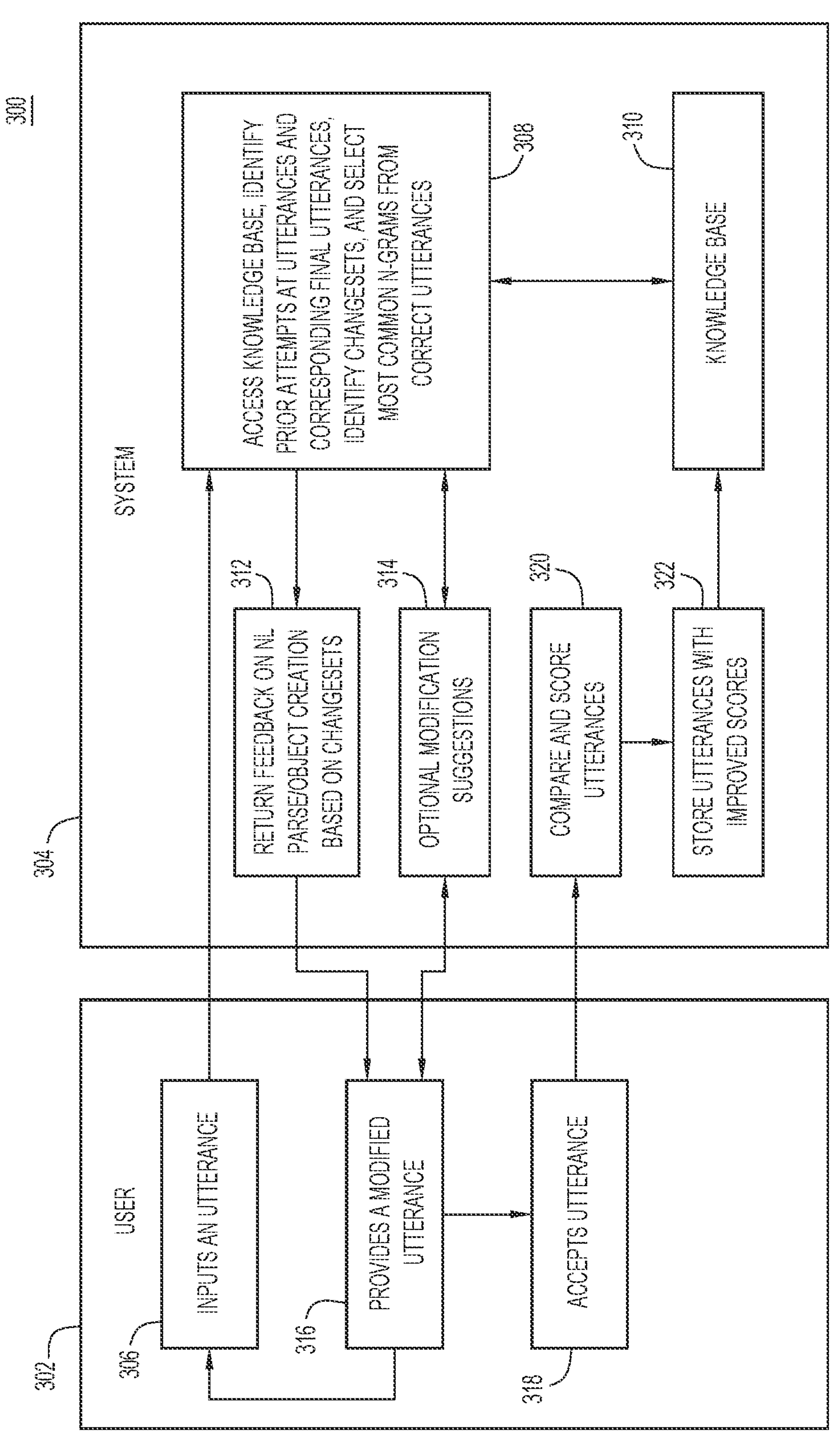
FIG. 3 is a flowchart of a process of analyzing user input to improve task execution according to an embodiment of the present invention.

FIG. 3 is a flowchart of a process 300 of analyzing user input to improve task execution according to an embodiment of the present invention. As depicted, process 300 is organized according to actions performed by a user 302 and actions performed by a computing system 304. User 302 actions can be performed using a client device (e.g., computer 101) and system 304 actions can either be performed by a same client device or a server (e.g., end user device 103, public cloud 105, private cloud 106, etc.).

At operation 306, a user inputs an utterance. The utterance may include one or more words or phrases that correspond to one or more commands or requests for particular computing tasks to be executed. The utterance can be transferred to system 304 for processing at operation 308.

At operation 308, the user's utterance is analyzed to identify modifications for the utterance based on previous user interactions. Initially, knowledge base 310 is accessed to identify prior attempts at utterances that are similar to the user's utterances. The knowledge base may contain prior attempt records, which are prior user interaction histories that include initial user utterances and subsequent user utterances as a user modifies his or her input, including a final user utterance that the user ultimately selected for executing the desired one or more computing tasks. In some embodiments, the prior attempts records are encoded using a clustering approach in which the closest records to the user's utterance can be identified. For example, a vector space model may be employed and the utterances can be vectorized so that a similarity measure (e.g., cosine similarity) can identify records whose initial user utterances are closest to the user's utterance that was provided at operation 306.

Once the closest prior attempt records are identified, changesets are identified that include the changes that each previous user made to his or her utterances between the initial utterance and the final utterance. A comparison operation can identify any deviations between an initial and final utterance, and extract the deviations in the form of n-grams (e.g., 3-grams of three-word sequences, etc.). Common n-grams can be identified among the different prior attempt records that are similar to the user's utterance, and the most common n-gram (or multiple most common n-grams) can be proposed to the user.

At operation 312, feedback is presented to the user to indicate how the user's natural language input was parsed. One or more objects may be visually presented that represent the computing tasks that would be performed based on the user's utterance. Additionally, the changesets can be presented by indicating proposed modifications (e.g., the most popular n-gram or n-grams) to the user's utterance. The user can provide a subsequent utterance at operation 316, and the process of operations 306, 308, 312, and 314 can be repeated one or multiple times until the user settles upon a final utterance, which the user accepts at operation 318.

At operation 320, the utterances of the user may be compared to the utterances of the prior attempt records, and the scores of each record may be adjusted accordingly. The score may be adjusted based on which modification the user ultimately selected. In particular, the record corresponding to the user's selected modification may be scored most favorably so that it will be more likely to be recommended in the future, and other records that are similar to that record may also be scored more favorably. Records that correspond to modifications that the user did not select may be scored unfavorably. The scores can be measured using any numerical value; in some embodiments, scores may range from zero to one with unfavorable scores closer to zero and favorable scores closer to one; in other embodiments, favorable scores may be represented using positive numbers and unfavorable scores may be represented using negative numbers, etc. The utterance records, including the user's own utterance, can be stored in knowledge base 310 at operation 322, and the scores of records in knowledge base 310 can be updated.

Figure 4A:
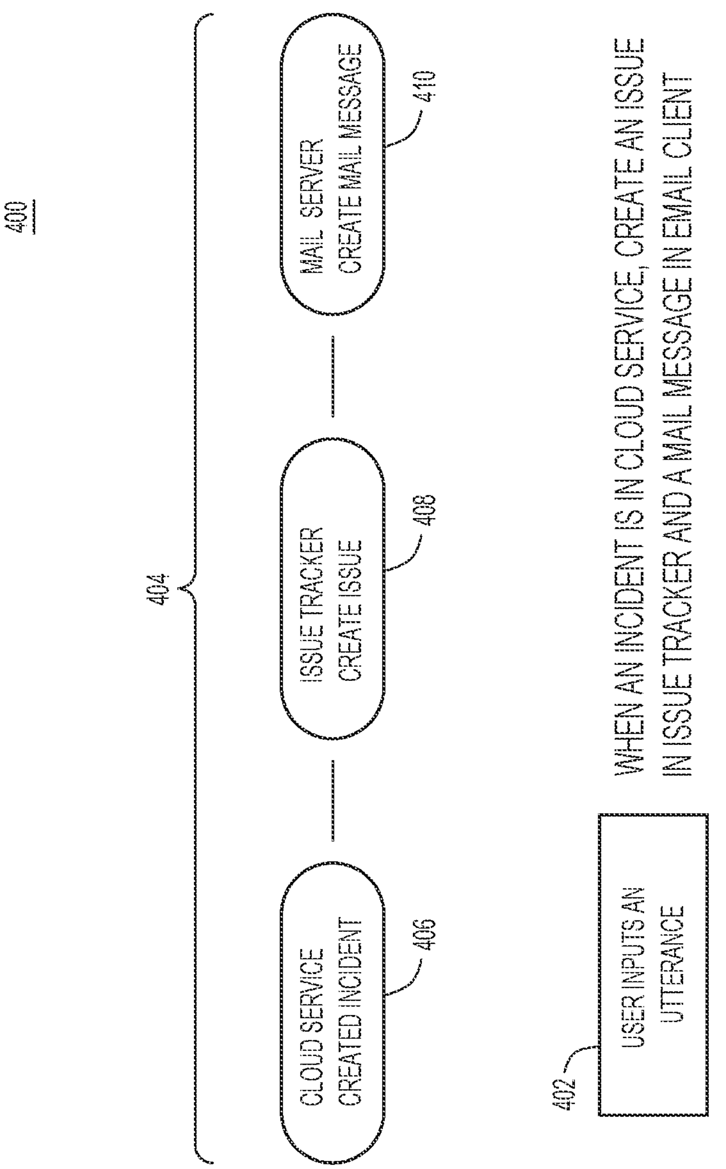
FIGS. 4A-4C are diagrams illustrating user input and interactions to execute tasks according to an embodiment of the present invention.
Figure 4B:
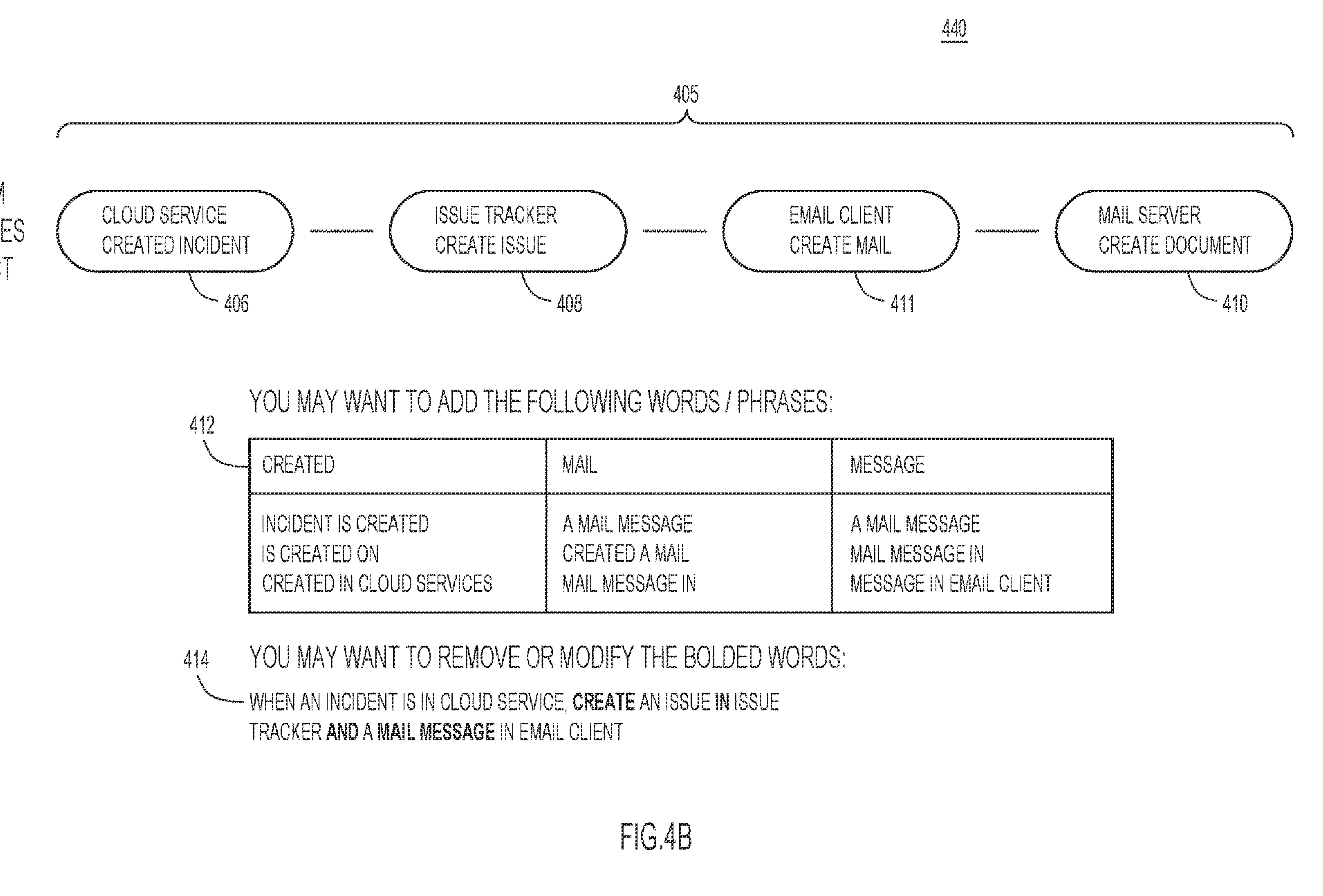
Figure 4C:
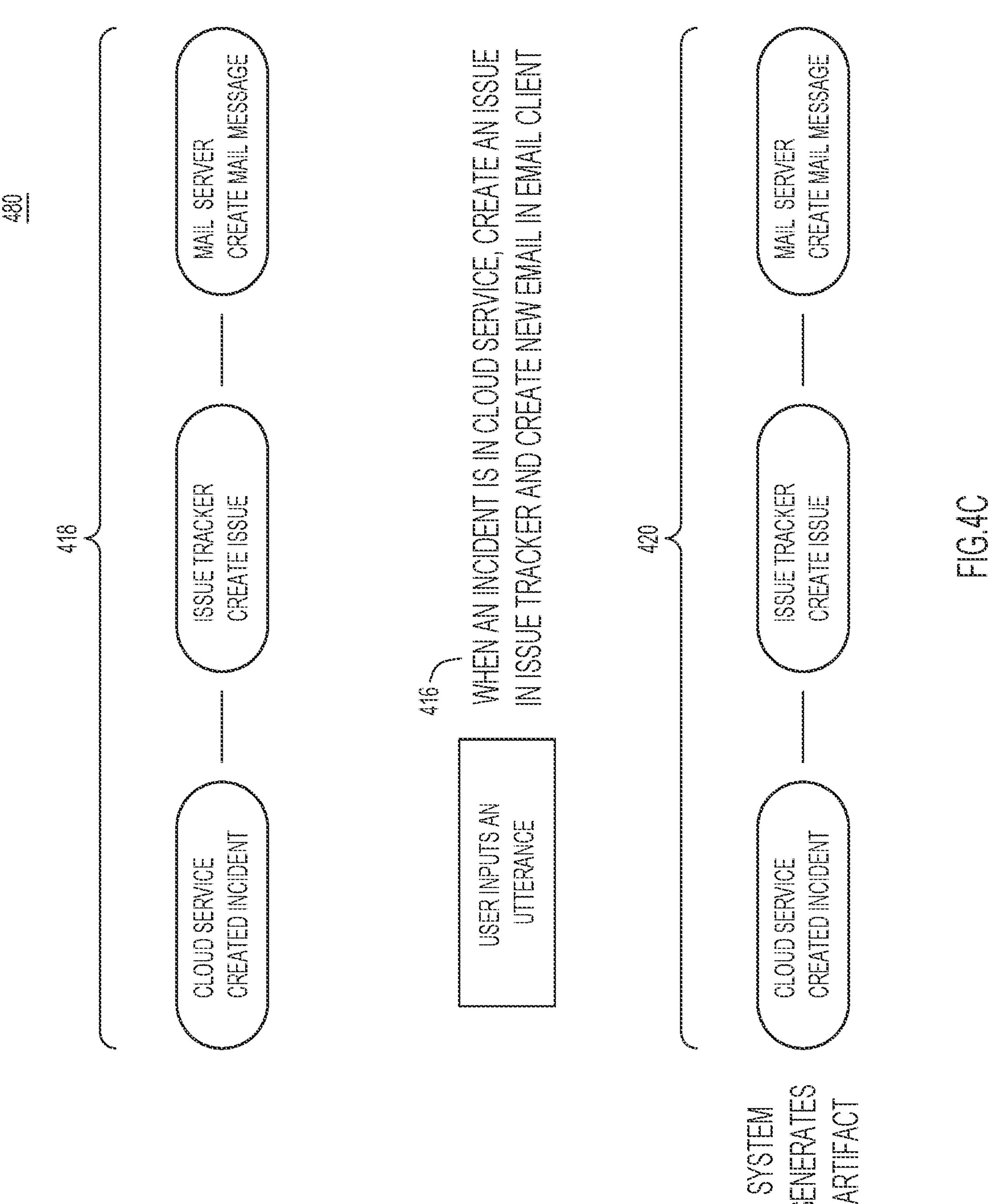

FIGS. 4A-4C are diagrams illustrating user input and interactions to execute tasks according to an embodiment of the present invention. With reference to FIG. 4A, an analyzed utterance 400 is shown having a visualization 404 that is generated based on a user's utterance 402. Utterance 402 is provided by a user, and includes a natural language request for computing tasks to be performed ("When an incident is in Cloud Service, create an issue in Issue Tracker and a mail message in E-mail Client"). The NLP model generates visualization 404 that is presented to the user in which each command is represented with a visual element that indicates which program will be used and which task in particular will be performed. In the depicted example, Cloud Service 406 will create an incident, Issue Tracker 408 will create an issue, and E-mail Server 410 will create a mail message.

With reference now to FIG. 4B, an analyzed utterance 440 is shown in which feedback 412 and 414 is provided. In the depicted example, visualization 405 shows that Cloud Service 406 will create an incident, Issue Tracker 408 will create an issue, E-mail Client 411 will create an e-mail, and E-mail Server 410 will create a document. Feedback 412 is a user interface that is presented to the user, and proposes modifications to different words in the user's utterance. Additionally or alternatively, feedback 414 may be presented that shows the user's utterance with visual indicators to indicate the words or phrases that should be modified. In the depicted example, feedback 414 places the words "create," "in," "and," and "mail message" in bold to indicate that the user may desire to modify those words to achieve better results.

Turning now to FIG. 4C, an analyzed utterance 480 is shown in which the user has accepted proposed modifications and provided a modified utterance 416. The computing tasks that would result from this utterance are presented to the user via visualization 420, so that the user can confirm that the utterance will result in execution of the user's intended tasks (depicted as task flow 418). Thus, the user can confirm, and the computing system may then execute the tasks.

Figure 5:
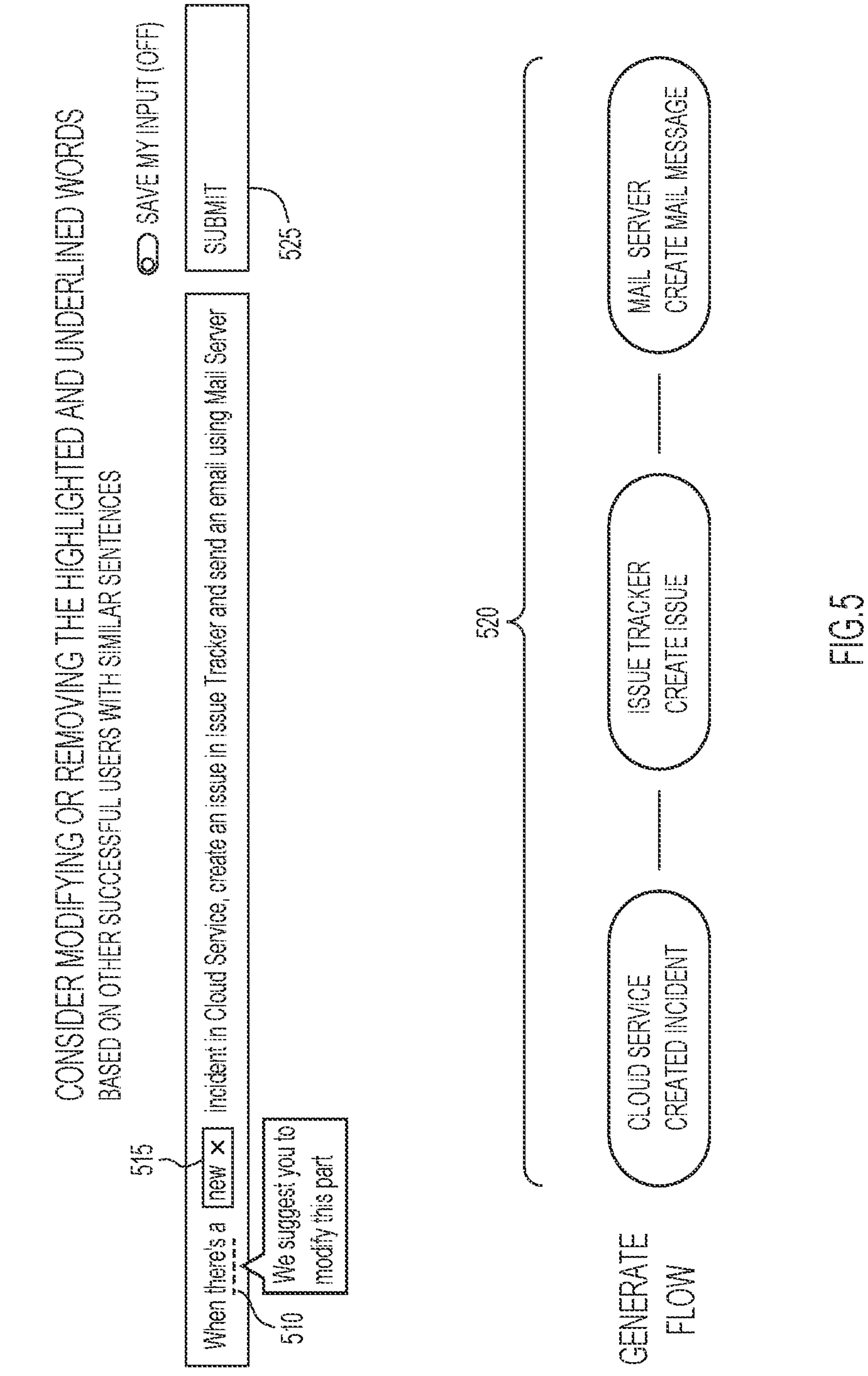
FIG. 5 is a diagram depicting a user interface according to an embodiment of the present invention.

FIG. 5 is a diagram depicting a user interface 500 according to an embodiment of the present invention. As depicted, user input 505 includes text that may be generated from a user utterance. A visual indicator 510 may be presented to suggest which words should be modified. In the depicted example, visual indicator 510 is an underline; in various embodiments, any indicator can be used, such as highlighting, bolded text, different text colors, and the like. Another visual indicator 515 may propose a specific suggestion to the user; in this depicted embodiment, the system suggests to include the word "new," which the user can accept or remove. Generated workflow 520 shows the computing tasks that will occur based on the user's input, so that the user may verify that the tasks are indeed those that the user desires. Once the user has confirmed the input, with or without modifications, the user can actuate the submit button 525 to cause the computing tasks to be performed.

Figure 6:
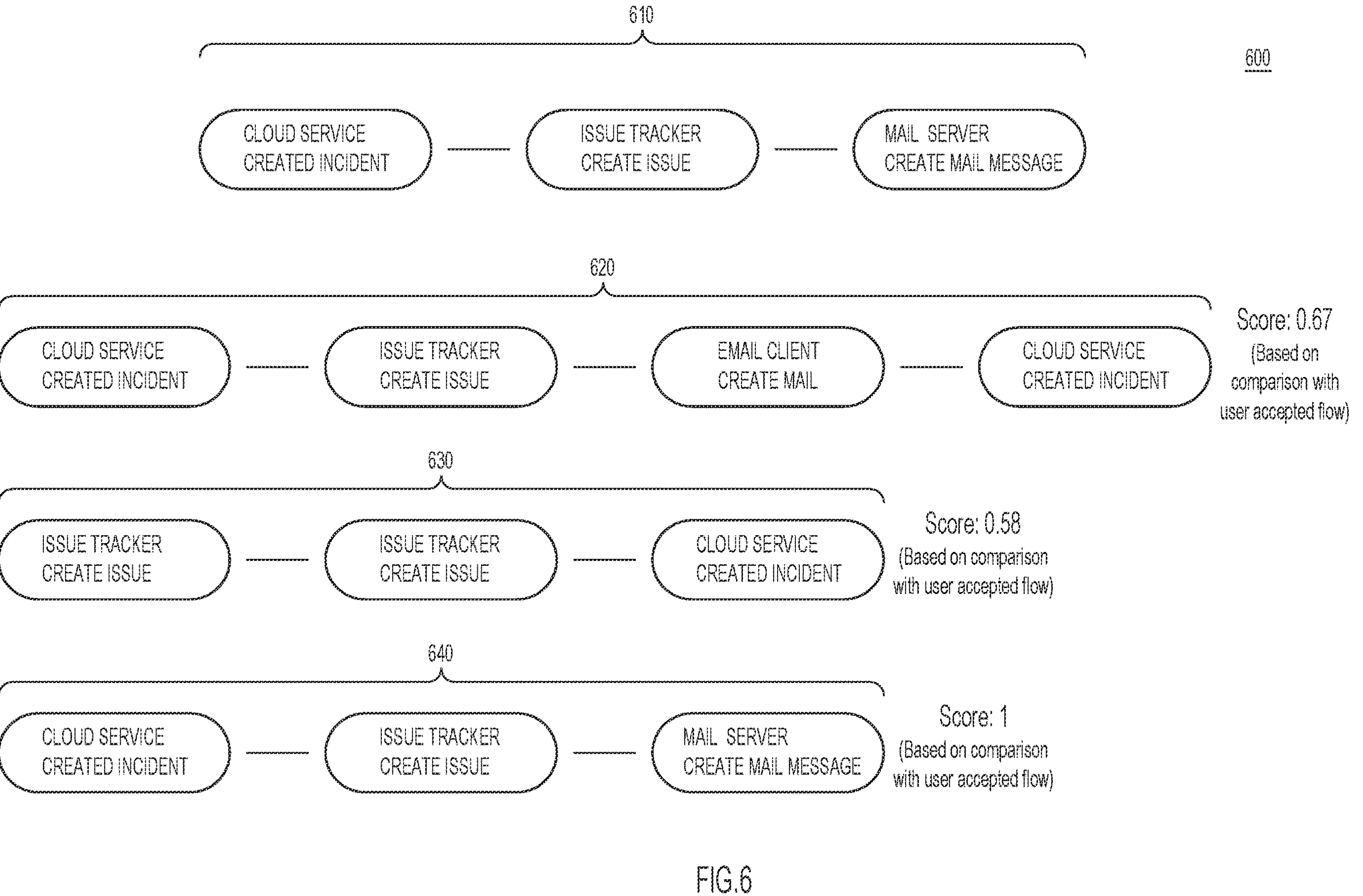
FIG. 6 is a block diagram depicting an example of scoring user inputs according to an embodiment of the present invention.

FIG. 6 is a block diagram depicting an example 600 of scoring user inputs according to an embodiment of the present invention. As depicted, the user ultimately chose to input an utterance to cause computing tasks 610 to be performed. The computing tasks resulting from various modifications that were presented to the user may be compared to computing tasks 610 to score each proposed modification's record. As depicted, record 620 receives a score of 0.67 and record 630 receives a score of 0.58 based on comparisons with the user's accepted flow. Record 640 receives a score of 1.0 because the computing tasks of record 640 match the flow of computing tasks 610 that the user accepted. Thus, when another user inputs a same initial utterance to the system, record 640 will be most likely to be used to recommend modifications to the user's utterance.

Figure 7:
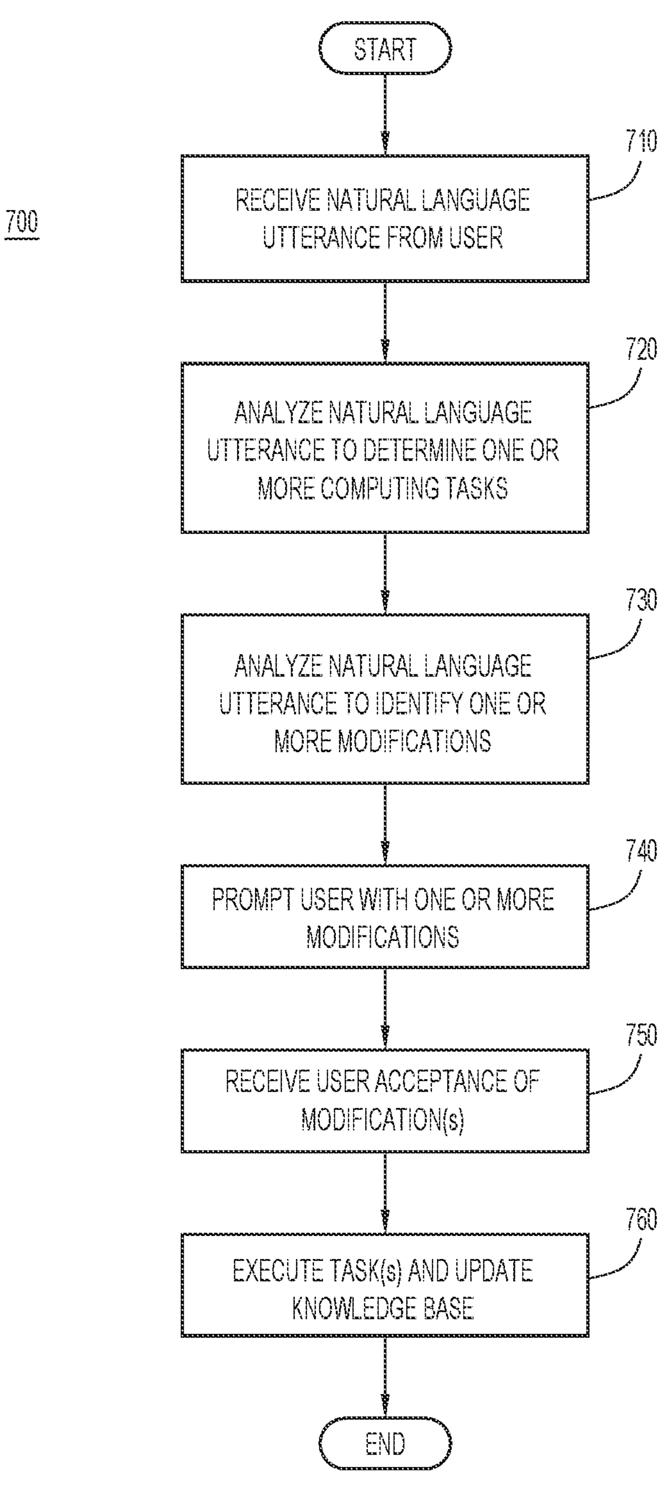
FIG. 7 is a flowchart of a method of applying an NLP model according to an embodiment of the present invention.

FIG. 7 is a flowchart of a method 700 of applying an NLP model according to an embodiment of the present invention.

A natural language utterance is received from a user at operation 710. The user may provide input by speaking, and the user's speech can be captured via a microphone, converted into a signal, and processed using a speech-to-text model to output the utterance in a computer-readable text form.

The natural language utterance is analyzed to determine one or more computing tasks at operation 720. A natural language processing model may analyze the text of the natural language utterance to identify one or more computing tasks that the user is requesting to be performed in the utterance. The identified one or more computing tasks may be presented to the user via a user interface so that the user may view how the user's input was interpreted by the natural language processing model. Thus, the user can see specific computing tasks that were selected based on the user's input, which may or may not be the tasks that the user actually desires to execute.

The natural language utterance is analyzed to determine one or more modifications at operation 730. The utterance can be compared to similar or same utterances in a knowledge base that includes records of previous user interactions. In particular, the utterance can be compared to initial historical user inputs, and the manner in which each user modified his or her input before ultimately approving execution of the computing task(s) can be analyzed to extract one or more modifications for the current user.

The user is prompted with one or more modifications at operation 740. The modifications may be visually presented to the user by highlighting or otherwise indicating specific portions (e.g., a specific word or words/phrases) of the user's utterance that may require modification.

A user acceptance of at least one modification is received at operation 750. The user may select as many modifications as are presented to the user, or a subset of modifications. The user can select the modifications to automatically cause the utterance to be re-analyzed, or the user may manually input an utterance in which the user makes the desired modifications.

The one or more tasks are executed and the knowledge base is updated at operation 760. The tasks that correspond to the user utterance that the user accepted may be executing by a computing system, and the user's modifications can serve as a new historical user record that is used to update the knowledge base. Thus, as users engage the natural language processing system over time, the knowledge base continuously improves. Accordingly, present embodiments provide a self-updating natural language processing model that provides the practical application of improving user experience in a fully-automated manner.

It will be appreciated that the embodiments described above and illustrated in the drawings represent only a few of the many ways of implementing embodiments for analyzing user input using a natural language processing model.

The environment of the present invention embodiments may include any number of computer or other processing systems (e.g., any computing device, including a local client device, a remote server, or a combination thereof, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system. These systems may include any types of monitors and input devices (e.g., keyboard, mouse, voice recognition, etc.) to enter and/or view information.

It is to be understood that the software of the present invention embodiments (e.g., speech-to-text module 210, NLP module 220, input modification module 230, task execution module 240, etc.) may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client, distributed computing, and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the computing system. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information (e.g., user utterance data, historical user interaction data, modification data, natural language processing model data, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The user utterance data, historical user interaction data, modification data, natural language processing model data, and/or any other data may include any information arranged in any fashion, and may be configurable based on rules or other criteria to provide desired information to a user.

The present invention embodiments are not limited to the specific tasks or algorithms described above, but may be utilized for any form of comparing user interactions with previous user interactions to improve user experience.

The data may include any format of storing data and may include any data descriptive of different versions of a document. The data may be obtained via any techniques, and may be accessed over a network, fetched from local storage, provided via user input, and the like.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of analyzing a user input via natural language processing comprising:

training a machine learning based natural language processing (NLP) model, using sequences of tasks, to determine one or more computing tasks from a constrained set of computing tasks based at least on a knowledge base and user utterance data;

analyzing, using the machine learning based NLP model, a natural language utterance from a user to determine the one or more computing tasks;

analyzing the natural language utterance to identify one or more common n-grams, from prior attempt records of the knowledge base, that are similar to the natural language utterance;

identifying, based on the one or more common n-grams, one or more modifications to the natural language utterance that are based on previous user modifications to a previous user utterance;

receiving an indication that the user accepted at least one modification of the one or more modifications, wherein the at least one modification modifies the one or more computing tasks and the one or more modifications are selected based on a score of each of a plurality of previous user utterances, and wherein the score is determined, using the prior attempt records, based on how many times a previous user accepted the at least one modification;

executing, using the machine learning based NLP model, the modified one or more computing tasks;

updating the knowledge base based at least in part on executing the modified one or more computing tasks; and retraining the machine learning based NLP model using the updated knowledge base.

2. The computer-implemented method of claim 1, wherein the user accepting the at least one modification adjusts a score of the previous user utterance in the knowledge base.

3. The computer-implemented method of claim 1, further comprising:

prompting the user via a user interface that displays text comprising the natural language utterance of the user and one or more visual elements corresponding to the one or more modifications.

4. The computer-implemented method of claim 1, wherein the knowledge base is updated in response to the user providing a previously-unprompted modification.

5. The computer-implemented method of claim 1, wherein the knowledge base includes a plurality of records of previous user interactions of a plurality of users, wherein each previous user interactions includes at least one initial utterance and at least one modified utterance.

6. The computer-implemented method of claim 1, wherein the one or more modifications include a word or phrase to be added to the natural language utterance, to be replaced in the natural language utterance, or to be removed from the natural language utterance.

7. A computer system for analyzing user input via natural language processing comprising:

one or more processors; and one or more memory devices coupled to the one or more processors, wherein the one or more processors are configured to:

train a machine learning based natural language processing (NLP) model, using sequences of tasks, to determine one or more computing tasks from a constrained set of computing tasks based at least on a knowledge base and user utterance data;

analyze, using the machine learning based NLP model, a natural language utterance from a user to determine the one or more computing tasks;

analyze the natural language utterance to identify one or more common n-grams, from prior attempt records of the knowledge base, that are similar to the natural language utterance;

identify, based on the one or more common n-grams, one or more modifications to the natural language utterance that are based on previous user modifications to a previous user utterance;

receive an indication that the user accepted at least one modification of the one or more modifications, wherein the at least one modification modifies the one or more computing tasks and the one or more modifications are selected based on a score of each of a plurality of previous user utterances, and wherein the score is determined, using the prior attempt records, based on how many times a previous user accepted the at least one modification;

execute, using the machine learning based NLP model, the modified one or more computing tasks;

update the knowledge base based at least in part on executing the modified one or more computing tasks; and retrain the machine learning based NLP model using the updated knowledge base.

8. The computer system of claim 7, wherein the user accepting the at least one modification adjusts a score of the previous user utterance in the knowledge base.

9. The computer system of claim 7, wherein the one or more processors are further configured to:

prompt the user via a user interface that displays text comprising the natural language utterance of the user and one or more visual elements corresponding to the one or more modifications.

10. The computer system of claim 7, wherein the knowledge base is updated in response to the user providing a previously-unprompted modification.

11. The computer system of claim 7, wherein the knowledge base includes a plurality of records of previous user interactions of a plurality of users, wherein each previous user interactions includes at least one initial utterance and at least one modified utterance.

12. The computer system of claim 7, wherein the one or more modifications include a word or phrase to be added to the natural language utterance, to be replaced in the natural language utterance, or to be removed from the natural language utterance.

13. A non-transitory computer-readable medium storing a set of instructions for analyzing user input via natural language processing, the set of instructions comprising:

one or more instructions that, when executed by one or more processors of a device, cause the device to:

train a machine learning based natural language processing (NLP) model, using sequences of tasks, to determine one or more computing tasks from a constrained set of computing tasks based at least on a knowledge base and user utterance data;

analyze, using the machine learning based NLP model, a natural language utterance from a user to determine the one or more computing tasks;

analyze the natural language utterance to identify one or more common n-grams, from prior attempt records of the knowledge base, that are similar to the natural language utterance;

identify, based on the one or more common n-grams, one or more modifications to the natural language utterance that are based on previous user modifications to a previous user utterance;

receive an indication that the user accepted at least one modification of the one or more modifications, wherein the at least one modification modifies the one or more computing tasks and the one or more modifications are selected based on a score of each of a plurality of previous user utterances, and wherein the score is determined, using the prior attempt records, based on how many times a previous user accepted the at least one modification; and execute, using the machine learning based NLP model, the modified one or more computing tasks;

update the knowledge base based at least in part on executing the modified one or more computing tasks; and retrain the machine learning based NLP model using the updated knowledge base.

14. The non-transitory computer-readable medium of claim 13, wherein the user accepting the at least one modification adjusts a score of the previous user utterance in the knowledge base.

15. The non-transitory computer-readable medium of claim 13, wherein the one or more instructions cause the device to:

prompt the user via a user interface that displays text comprising the natural language utterance of the user and one or more visual elements corresponding to the one or more modifications.

16. The non-transitory computer-readable medium of claim 13, wherein the knowledge base is updated in response to the user providing a previously-unprompted modification.

17. The non-transitory computer-readable medium of claim 13, wherein the knowledge base includes a plurality of records of previous user interactions of a plurality of users, wherein each of the previous user interactions includes at least one initial utterance and at least one modified utterance.

18. The computer-implemented method of claim 1, further comprising:

vectorizing user utterances from the prior attempt records to identify an utterance closest to the natural language utterance of the user.

19. The computer system of claim 7, wherein the one or more processors are further configured to:

vectorize user utterances from the prior attempt records to identify an utterance closest to the natural language utterance of the user.

20. The non-transitory computer-readable medium of claim 13, wherein the one or more instructions cause the device to:

vectorize user utterances from the prior attempt records to identify an utterance closest to the natural language utterance of the user.

* * * * *